(12) United States Patent
Hong et al.

(10) Patent No.: US 12,107,814 B2
(45) Date of Patent: Oct. 1, 2024

(54) SELECTIVE MULTI-MODAL AND CHANNEL ALERTING OF MISSED COMMUNICATIONS

(71) Applicant: Zoom Video Communications, Inc., San Jose, CA (US)

(72) Inventors: Jonathan Kwan Hong, Brooklyn, NY (US); Michael Richard Williams, Brooklyn Park, MN (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/897,633

(22) Filed: Aug. 29, 2022

(65) Prior Publication Data

US 2024/0073174 A1 Feb. 29, 2024

(51) Int. Cl.
*H04L 51/224* (2022.01)
*H04L 51/56* (2022.01)

(52) U.S. Cl.
CPC ............ *H04L 51/224* (2022.05); *H04L 51/56* (2022.05)

(58) Field of Classification Search
CPC .............................. H04L 51/224; H04L 51/56
See application file for complete search history.

(56) References Cited

U.S. PATENT DOCUMENTS

| 7,483,969 | B2 | 1/2009 | Chavda et al. |
| 8,171,032 | B2 | 5/2012 | Herz |
| 9,076,125 | B2 | 7/2015 | Manolescu et al. |
| 10,523,622 | B2 | 12/2019 | Barfield, Jr. et al. |
| 10,776,708 | B2 | 9/2020 | Ospinoso et al. |
| 2014/0108565 | A1 | 4/2014 | Griffin et al. |
| 2016/0191958 | A1* | 6/2016 | Nauseef ................. G06V 40/20 725/116 |
| 2017/0039278 | A1 | 2/2017 | Marra et al. |
| 2018/0129993 | A1 | 5/2018 | Fowler et al. |
| 2019/0124023 | A1* | 4/2019 | Conroy .................... G06N 7/01 |
| 2020/0204515 | A1 | 6/2020 | Zhou et al. |
| 2021/0358324 | A1 | 11/2021 | Lahiri et al. |
| 2021/0374831 | A1 | 12/2021 | Hudson |

(Continued)

OTHER PUBLICATIONS

ScienceDirect, Computers in Human Behavior Reports, Meeting by text or video-chat: Effects on confidence and performance, Vanessa Y. Oviedo, Jean E. Fox Tree, https://www.sciencedirect.com/science/article/pii/S2451958821000026, vol. 3, Jan.-Jul. 2021, 26 pages.

(Continued)

*Primary Examiner* — David R Lazaro
*Assistant Examiner* — Zia Khurshid
(74) *Attorney, Agent, or Firm* — Young Basile Hanlon & MacFarlane, P.C.

(57) ABSTRACT

A communications monitoring software identifies first communications between a user and other users. The communications monitoring software associates respective communication scores with the first communications based on respective communication feature scores of identified communications features of the first communications. Second communications associated with the user are identified. The communications monitoring software identifies a subset of the second communications based on respective communication scores of the first communications. The subset of the second communications is presented in a user interface.

18 Claims, 9 Drawing Sheets

(56) References Cited

U.S. PATENT DOCUMENTS

2022/0076279 A1    3/2022   Renaud
2022/0383659 A1   12/2022   Taylor
2023/0067628 A1    3/2023   Carter et al.
2024/0005914 A1    1/2024   Zolin et al.

OTHER PUBLICATIONS

The Journal of Interactive Technology and Pedagogy, Assessing the Effectiveness of Using Live Interactions and Feedback to Increase Engagement in Online Learning, Beth Porter, et al., https://jitp.commons.gc.cuny.edu/assessing-the-effectiveness-of-using-live-interactions-and-feedback-to-increase-engagement-in-online-learning/, May 11, 2021, 19 pages.

* cited by examiner

SELECTIVE MULTI-MODAL AND CHANNEL ALERTING OF MISSED COMMUNICATIONS

FIELD

This disclosure relates generally to communication management and, more specifically, to selective multi-modal and channel alerting of missed communications, user-aware communication feature identification, or both.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
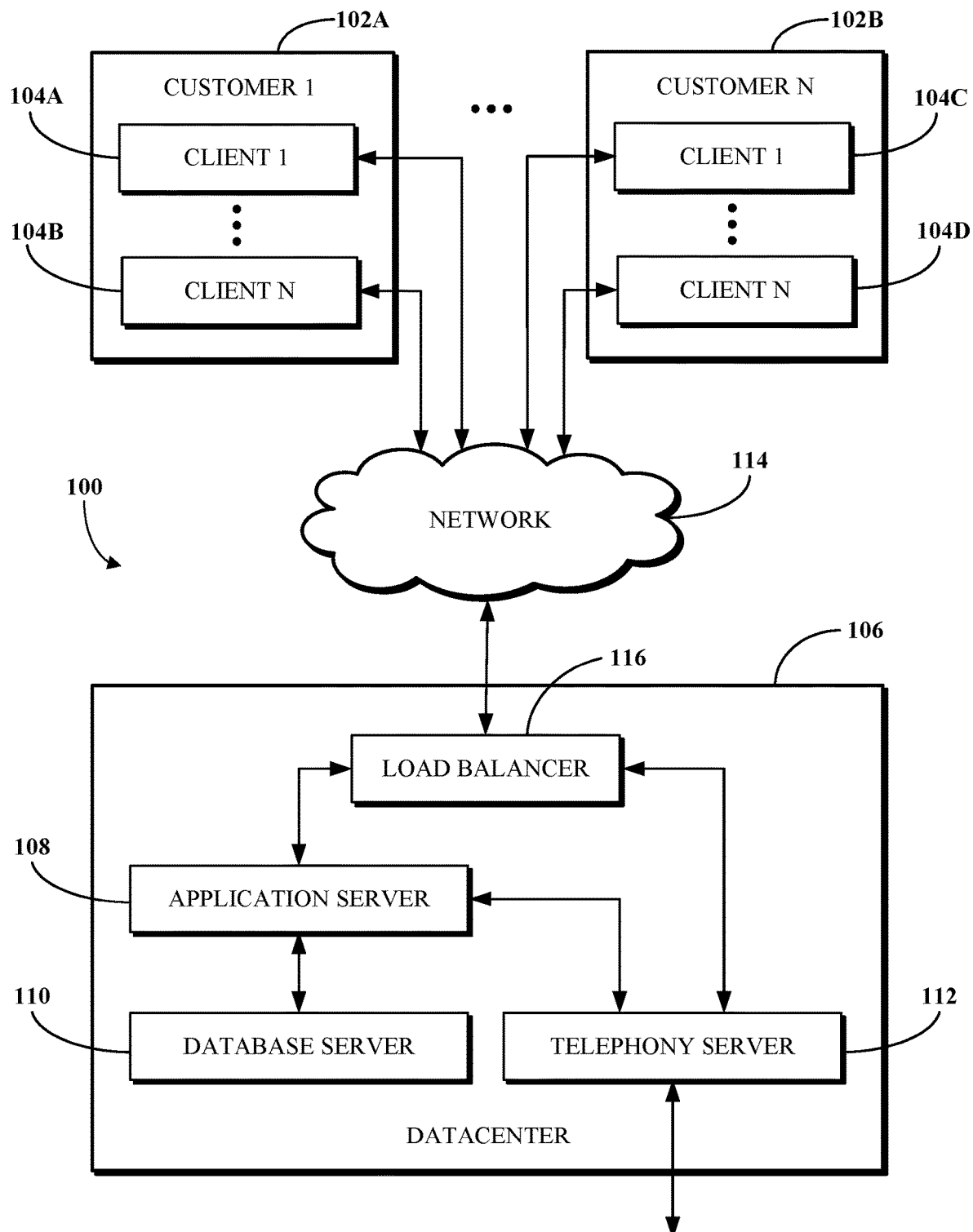
FIG. 1 is a block diagram of an example of an electronic computing and communications system.

Humans (referred to herein as "users" of one or more software services) communicate via many different communication modalities or channels, which may be enabled by modality-specific communication tools (e.g., applications). The communication applications may be standalone applications or may be provided by a software platform, such as a unified communications as a service (UCaaS) platform. Examples of communication applications include those described with respect to FIG. 3. Some types of communications (such as in-person communications) may not be enabled by communication software.

At any moment in time throughout a given day, users may be inundated with communications. For example, a user may simultaneously or otherwise in a short period of time receive communications over a message-based modality (such as Multimedia Messaging Service (MMS) messages, short message service (SMS) messages, email messages, chat messages, or a combination thereof), be notified of messages posted to group chats (such as public chat rooms or team channels), be participating in a video conference, receive a telephone call, receive notifications of new voice mails, be in one-on-one chat sessions, and/or be carrying an in-person conversation with another person. Tending to all of these communications in real time can be, to say the least, highly draining and disruptive to work efficiency, especially when a significant amount of these communications amount to noise (e.g., are at least currently unimportant or unnecessary for the user to currently respond to).

This problem is compounded when communications accumulate over time, such as when the user is unavailable to respond to received communications. That a user is unavailable may include that the user is offline (e.g., away from their computer, such as because the user is taking a walk or is asleep), is online but not immediately responding to received communications, not interacting with a communication application via which at least some communications are received, or the like.

A user may access certain types of communications using respective tools (e.g., applications) designed to enable user interactions with such communications. To illustrate, the user may use an email application to access or interact with (e.g., read, compose, or respond to) emails, a chat application to read and compose chat, SMS, or MMS messages, a telephone application to place telephone calls and to view missed calls, a video conferencing application to participate in video conferences and chats between participants thereof, and so on. The user may switch between such applications to review missed communications respectively available via such applications. A "missed communication" can be one that may not be tended to by the user upon receipt, may be flagged by the user for further follow up, or the like.

Some communications may be more important than others. The importance of a communication may be determined based on importance criteria. Importance criteria may include or be based on a sender (or more generally, an initiator) of the communications, the context of the communications, the content and/or subject of the communication, content related to the communication, a current context (or situation) related to the user, other importance criteria, or a combination thereof.

To determine (e.g., identify) important communications, a user typically moves (e.g., launches or switches) from one communication application to another, reviews a list of the received communications accessible via that application, and determines which to engage with. To determine whether to engage with a communication, the user may simply scan some of data associated with the communication (e.g., a subject, a title, or a sender) or may have to review (e.g., read or listen to) at least a portion of the communication.

However, in addition to reducing the productivity of users, switching to or launching applications and sifting through the list of missed communications accessible via the applications typically requires and thus consumes computational resources, network sources, or both of client devices, server devices, or both. For example, a client device may expend computational resources to execute the relevant applications, to retrieve the subject communications, and to display the communications; and a server device, may deliver services associated with the relevant applications to the client device, may execute some or all of the applications, may retrieve the communications, and may transmit the communications for display at a client device. Such consumption of computations and/or network resources may degrade the performance of client devices, the server devices, or both.

The possibility of degraded performance and increased usage of the computational and network resources may also include substantially increased investment in processing, memory, and storage resources at the client devices, server devices, or both and may also result in increased energy expenditures (needed to operate those increased processing, memory, and storage resources, and for the network transmission of the database commands) and associated emissions that may result from the generation of that energy.

Traditional communication applications or UCaaS platforms lack the technical capabilities to identify a subset of communications (i.e., the important communications) that a user should focus on from amongst the collective total of communications received via different modalities or communication channels. The lack of such technical capabilities results in the described consumption of computational resources, network sources, or both because, as described, to identify such important communications, the user resultantly will have to sift through all of the received communications from different communication channels to identify those which are important to action, which may include causing multiple applications to unnecessarily run.

To illustrate and reiterate the problem, while a user (i.e., a person) is engaged in a mentally intensive activity (such as writing a report or programming a complex algorithm), the user may miss, ignore, or otherwise not engage with communications presented or received in different communication channels (e.g., chat, voicemail, calendar, telephone, video, or email). Traditionally, to catch up with the missed communications, the user would have to engage with each of those individual communication channels separately to process and interpret what is missed, only to then have to decide whether information in the any of the communications is important enough to act on. As such, no holistic approach exists to surfacing valuable and timely information at a point in time.

Implementations of this disclosure addresses problems such as these using communications monitoring software for identifying important communications before communications are reviewed by the user and so that the user does not have to sift through received communications to identify ones that the user may wish, need, or has to focus on. As such, the implementations of this disclosure identify important communications for a user and recommends communication actions based on what is determined to be currently important to the user.

Previous communications (i.e., communications features of such communications) between a user and other users, communication channels, or both can be used to identify and present important communications to the user. Scores are assigned to at least some of the previous communications (i.e., communication scores) based on communication feature scores assigned to identified features of the communications. The scores of the interactions are used to identify the important communications. A communication feature of a communication can be any aspect of the communication that can be used by the communications monitoring software to identify important communications, recommend communication actions, or a combination thereof.

Other problems addressed by this disclosure relate to promoting (e.g., facilitating or improving) relationships amongst users thereby contributing to increased productivity and efficiencies. A relationship between two users may be a project-based relationship (such as between users identified as working on a same project), a team-based relationship (such as between users that below to a same team), an organization-based relationship (such as between users and others in their reporting organizational structure), a personal relationship, or some other type of relationship.

As can be appreciated, meaningful interactions (i.e., communications over one or more modalities) between users create good personal and/or work relationships. Relationships are easier to create when users (e.g., employees) are physically co-located and are able to have frequent in-person interactions. However, remote and hybrid work situations are becoming increasingly common with recent advances of real-time communications software and network infrastructure and the greater availability of compatible computing devices.

Remote work typically refers to a working model where employees do not commute to a central place of work (such as an office building), but rather can work from anywhere (such as from home); and hybrid work typically refers to a working model where employees may work partly at a central place of work and partly remotely. For simplicity of references, hybrid and remote work arrangements are collectively referred to herein as remote work. Communication software is an enabler to such working models. For brevity, both remote work and hybrid work may be referred to as remote work.

While remote work offers many conveniences and benefits, it can be a hindrance to relationship building. For example, remote workers may not feel included, sufficiently visible, or sufficiently in the know and may not be able to participate as equals in the work environment as co-located, on-site employees. While, as mentioned, real-time communications software enable remote work, aspects of on-line communications (such as a number of participants in a meeting, the quality of the communication channel (e.g., audio vs. video channel), and time between communications) may negatively impact the strength of relationships. Traditional communication software or platforms lack technical capabilities that can enable relationship building amongst users.

To promote equity and foster meaningful interactions between users therewith creating and strengthening relationships, implementations of a communications monitoring software according to this disclosure measure relationship strengths amongst users and recommend relationship strengtheners (e.g., communication modalities, communication actions, communication features, or a combination thereof) that improve (e.g., strengthen) the relationships. To illustrate, a teammate of a new employee may be designated as a "relationship target" for the new employee. In an example, the manager of the new employee may designate the teammate as the relationship target for the new employee. Implementations according to this disclosure identify and present relationship strengtheners to the new employee with respect to the teammate.

To describe some implementations in greater detail, reference is first made to examples of hardware and software structures used to implement selective multi-modal and channel alerting of missed communications, user-aware communication feature identification, or both. Selective multi-modal and channel alerting of missed communications can include identifying important communications. User-aware communication feature identification can include identification and recommendation of communication features that may improve relationships between two users. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
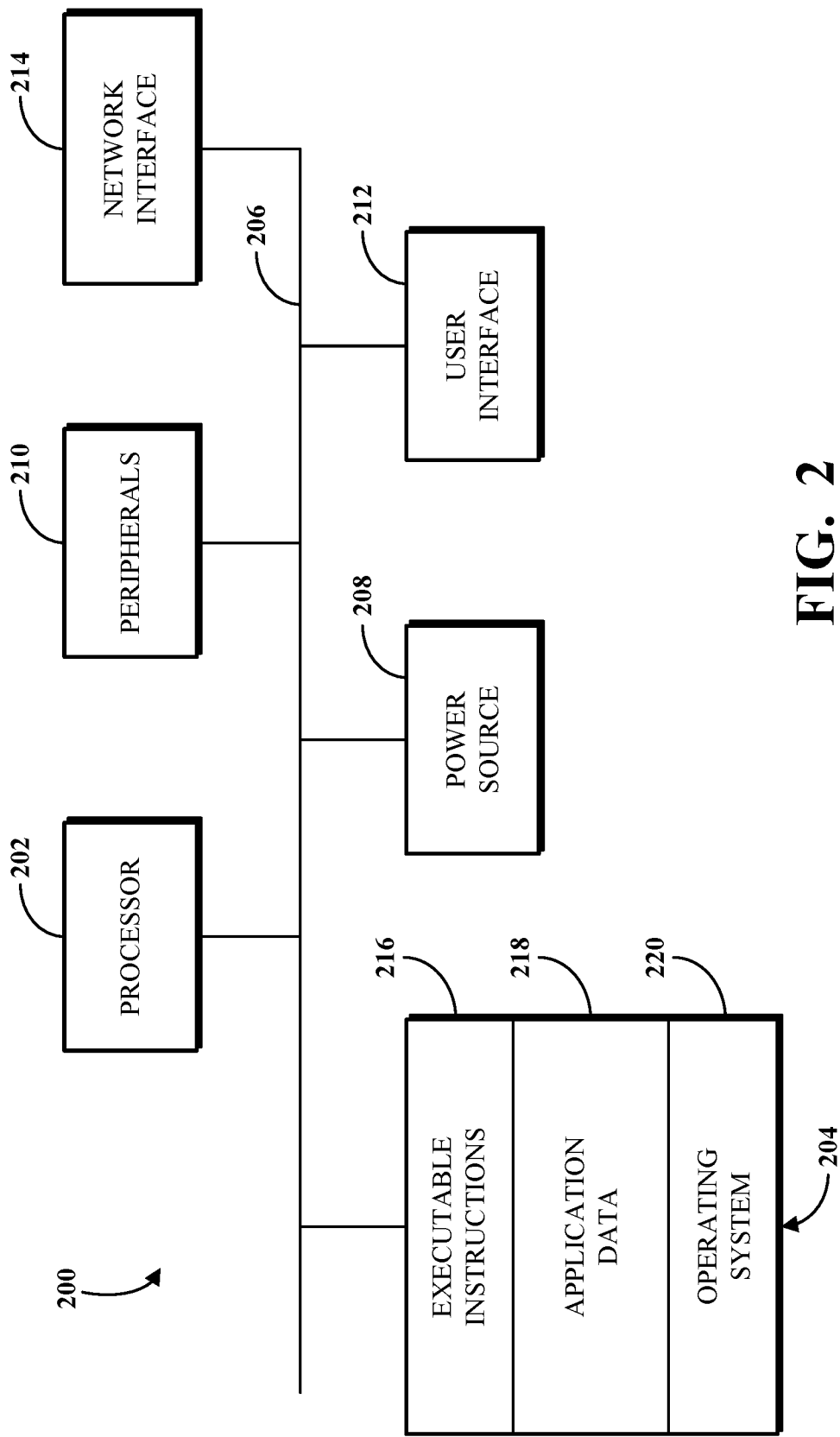
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
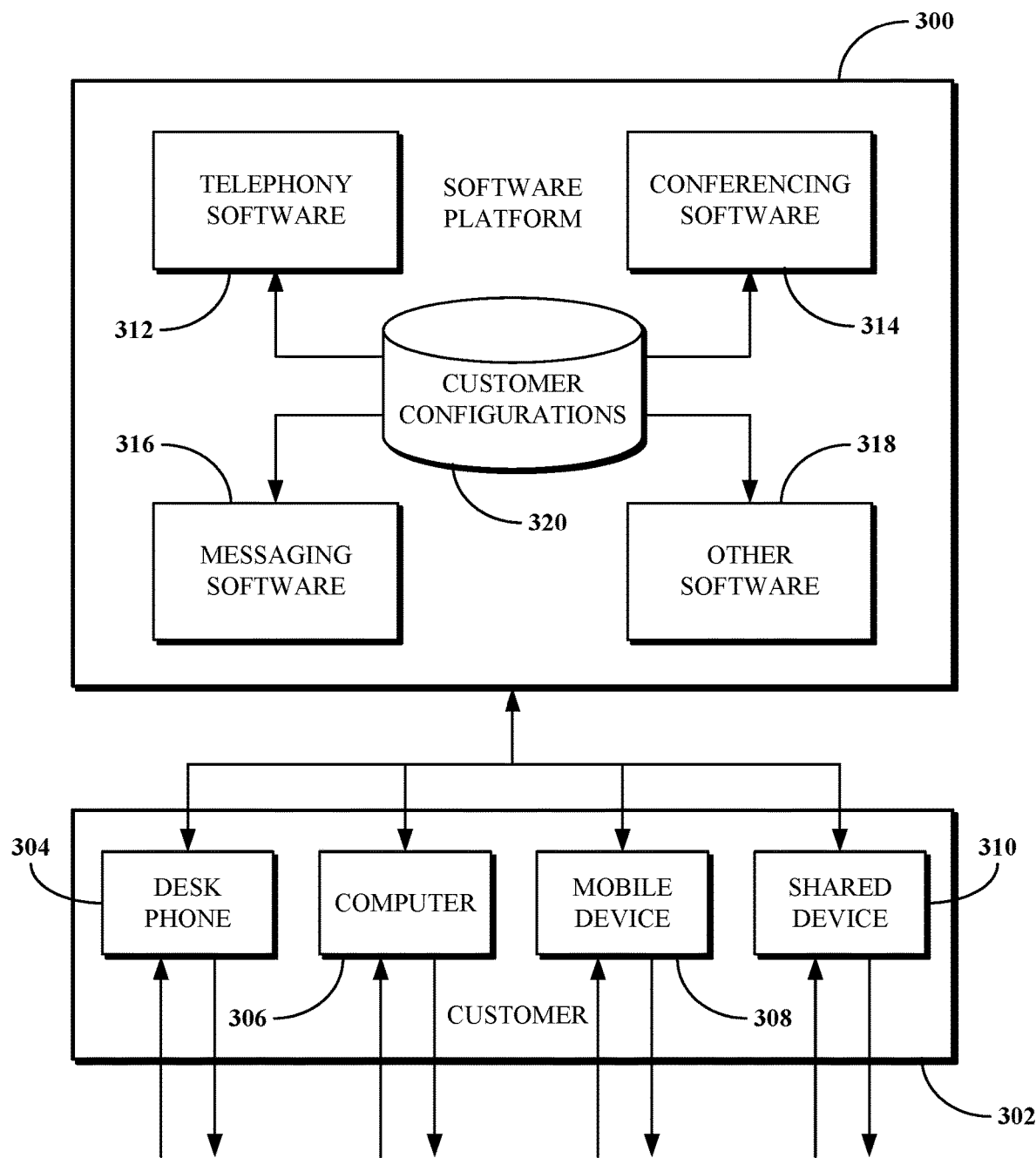
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting, scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can selectively alert a user of missed communications, can identify user-aware communication features, or both.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
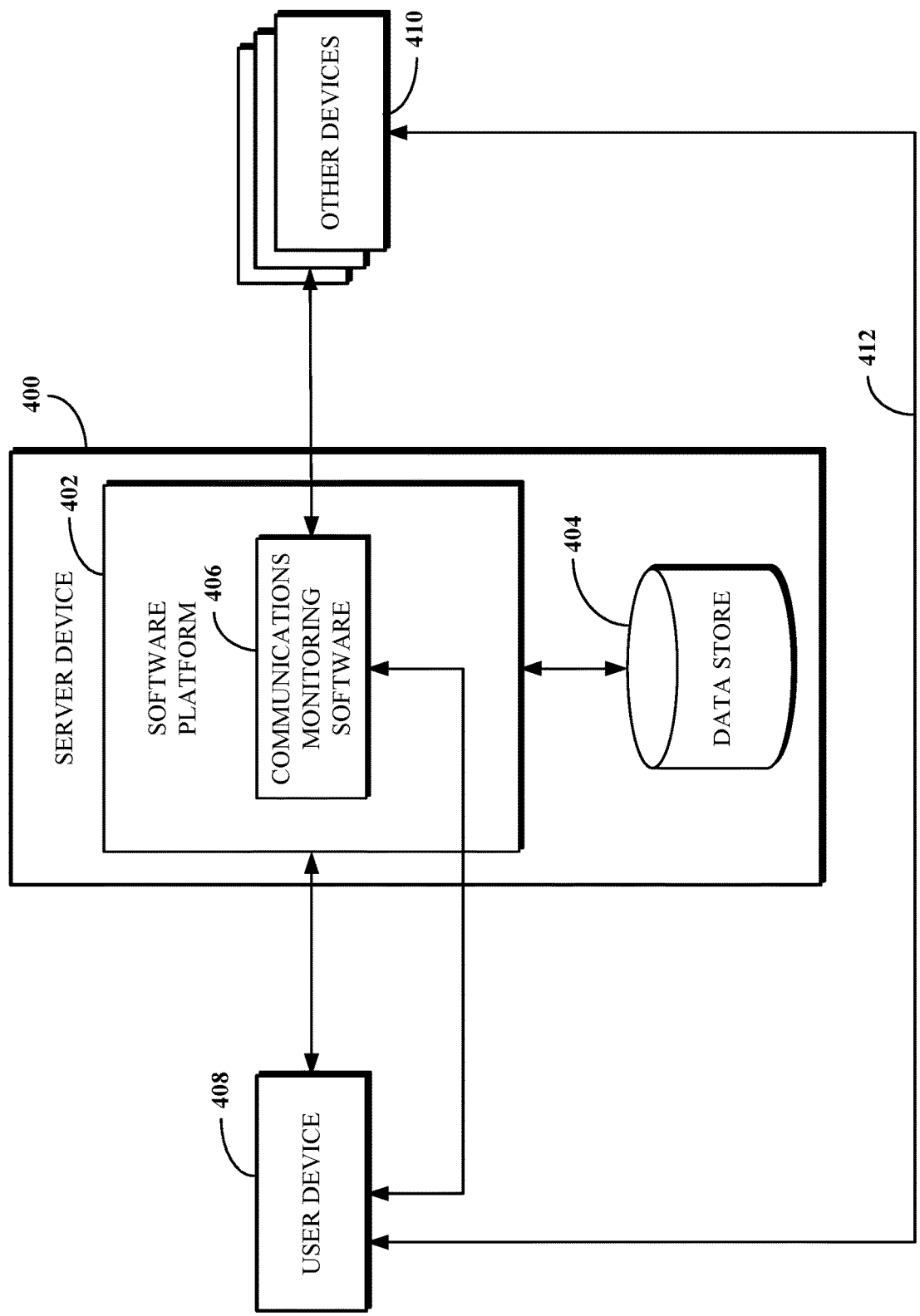
FIG. 4 is a block diagram of an example of a server device for selective multi-modal and channel alerting of missed communications, user-aware communication feature identification, or both.

FIG. 4 is a block diagram of an example of a server device 400 for selective multi-modal and channel alerting of missed communications, user-aware communication feature identification, or both. That is, the server device 400 can be used to identify important communications, identify and recommend communication features that may improve relationships, or both. As shown, the server device 400 implements or includes a software platform 402 and a data store 404. The server device 400 can be one or more servers implemented by or included in a datacenter, such as the datacenter 106 of FIG. 1. The data store 404 can be included in or implemented by a database server, such as the database server 110 of FIG. 1.

The software platform 402 can be the software platform 300 of FIG. 3. As such, the software platform 402 can include one or more of the software services, such as at least a subset of the software 312 through 318 of FIG. 3. The software 312 through 318 of FIG. 3 may be broadly referred to herein as communication software or types of communications software. The software platform 402 is shown as including a communications monitoring software 406. In an example, the communications monitoring software 406 may not be included in the software platform 402 but may work in conjunction with the software platform 402 or one or more of the software therein. The communications monitoring software 406 can be summarized as using data and heuristics to guide a user to a next task.

In an example, the communications monitoring software 406 can identify and present next communication-related steps to a user based on missed communications (e.g., telephone calls, chats, or other communication modality inputs). The next communication-related steps are related to (e.g., are for) a particular user and may be time-based. That is, as time passes, new data (i.e., communications-related data or communications) may be obtained (e.g., received, discovered, or determined) and different communication-related steps may be identified. In an example, if an identified next step requires human interaction, then the next step may include a best communication modality or channel that would result in a positive outcome amongst the communicating users. A positive outcome, in this context, can mean that if a first user sends a communication to a second user using a particular modality (or channel), then the second user is more likely to respond than if the first user used a different modality.

For brevity, and as used herein, that a first user communicates with a second user can include that the first user experiences a communication transmitted by the second user and/or that the second user experiences a communication transmitted by the first user. That a communication is experienced by a user can include that the communication can be read, listened to, observed, or experienced in any other way by the user.

The data store 404 can store data related to communications between users of a communication software. To illustrate, and with respect to a communication between a first user and a second user, the data store 404 can include, describe, or indicate the date of the communication, the modality of the communication, other participants in the communication, and features of the communication. The features of the communication can be determined (e.g., extracted, identified, measured, and the like) by the communications monitoring software 406, as further described herein.

The data store 404 can include data related to past, scheduled, ongoing, or recommended communications between users. The data store 404 can include data related to users of the software platform 402. To illustrate, the data store 404 can include a preferred communication modality of a user. The preferred communication modality of a user may be identified (e.g., inferred, determined, or the like) by the communications monitoring software 406 based on previous communications of the user.

One user device 410 of a user of the software platform 402 is shown as being connected to the server device 400 indicating that the user may use a software of the software platform 402 to place, receive, or otherwise interact with communications to or from users to other devices 410. Placing, receiving, or interacting with communications include, for example, participating in a video conference, participating in an audio conference, receiving a message, sending a message, receiving a telephone call, placing a telephone call, receiving a list of messages posted to a chat room, and so on. Placing, receiving, or interacting with communications can also include holding in-person communications not facilitated by communication software, as further described herein.

A user device 408 can be a device of a user who is configured (e.g., enabled) to or otherwise can use at least some of the services of the software platform 402. The user device 408 may be one of the clients 304 through 310 of FIG. 3. Alternatively, the user device 408 may be a device other than a client. The user device 408 may include one or more communication software, which may be one or more applications that execute at the user device 408 to enable the user to use respective services of the software platform 402. In some implementations, the user device 408 may include a communications monitoring software, which can be similar to the communications monitoring software 406. The server device 400 and the user device 408 can be considered to be constituents of a system for selective multi-modal and channel alerting of missed communications, user-aware communication feature identification, or both.

The user of the user device 408 may communicate with one or more users of the other devices 410. At least some of the other devices 410 may be devices of users of the software platform 402. As such, at least some of the other devices can be one of the clients 304 through 310 of FIG. 3. As such, any communication between the user device and one of the other devices 410 may be facilitated or communicated via the software platform 402. In some examples, a user of one of the other devices 410 may not be a user of the software platform 402. However, that other user may be able to communicate with the user of the user device 408 via the software platform 402.

In another example, and as illustrated by an arrow 412, the user of the user device 408 and a user of one of the other devices 410 may communicate via communication channels or modalities not mediated by (e.g., that are not via) the software platform 402. For such communications, a communications monitoring software of the user device 408 may be used to identify communication features, assign scores to such communication features, as described with respect to the communications monitoring software 406.

The user device 408 can include other input/output devices (not shown) that facilitate some types of communications, such as a camera device, a microphone, a speaker, other input/output devices, or a combination thereof. For example, a camera may be configured to capture images of the user while the user is in a communication session that is configured to allow for the exchange of video or still images between participants, such as a video conference. At least some of the camera images (or output images obtained therefrom) may be transmitted by the user device 408 to the server device 400, which may in turn transmit the images to devices of other communication session participants. The user device 408 may communicate directly with one or more of the other devices 410. The user device 408 can directly communicate with one or more such other devices using peer-to-peer, real-time communications. In some examples, the user of user device 408 may communicate with a user of one of the other devices within a communication software that is not provided by the software platform 402.

The communications monitoring software 406 uses features (i.e., communication features) of past communications of a user to identify and recommend actions with respect to incoming communications. As such, the communications monitoring software 406 can be considered to be an assistant that identifies for the user next steps to take with respect to at least some of the incoming communications (i.e., those of the incoming communications that the communications monitoring software 406 determines to be important communications). The communications monitoring software 406 identifies features of the past communications and assigns respective feature scores to at least some of the features. While a communication is ongoing between the user and another user, after the communication is completed, or both, the communications monitoring software 406 may identify the features of the communication, assign scores to at least some of features and store the features and scores in the data store 404.

In an example, the communications monitoring software 406 can essentially answer the question: given prior communications of the user with other users within a certain period of time, which ones of missed incoming communications are considered important so that the user can focus on them as opposed to wasting time on noise.

In an example, the user may transmit a request to the communications monitoring software 406 to receive the list of important communications, recommended actions, or both. In an example, the user may include a time window in the request. In another example, the communications monitoring software 406 may transmit the list of recommended actions according to a schedule (e.g., every three hours). The schedule may be configured by the user.

In an example, the list of recommended actions (e.g., communication features) may be presented to the user at the beginning of a workday of the user. In an example, the list of recommended actions may be presented to the user in response to detecting an event. The event can be the detection of mouse movement, a keyboard stroke, or the like after a predetermined idle period. Such an event can indicate that the user was away (e.g., was unavailable) but is available again. The event can be a determination that the user has changed a presence status from idle, away, or the like, to a status that indicates that the user is now available. The event can be a determination that the user is no longer in a meeting. That the user is in a meeting can be determined by examining calendar information of the user, by examining scheduled conferences that include the user as a participant, by determining that the user device 408 is no longer within or within a proximity of a conference room (based on a location of the user device 408), or some other way of determining that the user is in a meeting.

In an example, a notification of an important communication may include an explanation (i.e., a importance reason) of the reason that the communications monitoring software 406 identified the communication as important. In an example, the notification can include a recommended modality or channel for the user to respond to the important communication.

Illustrative, non-limiting examples of the operations of the communications monitoring software 406 are now provided.

In a first illustrative example, a first user may step away from their user device and, therefore, is not available to engage with received communications. Ten minutes later, the first user receives a text message from a second user; twenty minutes later, a third user posts a message in a public (e.g., companywide) chat room related to infrastructure of the company; and twenty five minutes later, the first user receives an email from a fourth user. The message posted in the public chat room pertains to a service outage. Other users responded with additional messages regarding the service outage. The email pertains to a personal matter (e.g., a planned fishing trip).

Upon their return (i.e., in response to detecting a mouse movement activity), the communications monitoring software 406 presents to the user (such as in a user interface) a recommended action to join the discussion in the public chat room. The communications monitoring software 406 may determine that the message in the public chat room is the only important communication that the first user missed. The communications from the second and fourth users are not presented as important communications.

The communication from the third user may be identified as important based on one or more of a role of the first user, a number of times that the first user engaged with (e.g., posted messages in) the public chat room, the posts that the first user responded to, and the content of the post (i.e., service outage). The communications monitoring software 406 may determine the role of the first user by examining a corporate directory, which may be or portions thereof may be included in the data store 404. For example, the corporate directory may indicate that the first user has a job title of "infrastructure support engineer," which the communications monitoring software 406 may determine to be correlated with service outages.

In an example, the communications monitoring software 406 may determine a role of the first user by examining a job description of the first user. For example, the job description of the first user may indicate specifically, and among other duties, that the first user is responsible for investigating and resolving service outages. In an example, data related to job descriptions of users of the software platform 402 may be included in the data store 404. In an example, the communications monitoring software 406 may perform keyword (including synonym) matching of contents of communications and roles and job descriptions to determine the importance of a communication to the user, as compared to other communications. As can be appreciated, the matching can be probabilistic. As such, only communications that exceed an important threshold (e.g., 75%) can be identified as important communications.

The notification may include an importance reason. The importance reason can identify for the user the reason(s) that the communications monitoring software 406 identified the communication as important. For example, the importance reason may essentially indicate that the communication is identified as important because "a posting (discussing service outage) related to your job role (infrastructure support engineer) was made in a forum (a public chat room) with which you engaged 112 in the last 12 days."

In a second illustrative example, a first user may be unavailable to engage with communications or communication channels (such as because the first user has turned off or exited communication applications to concentrate on completing a particular task). In the meanwhile, the first user receives an email message from a second user; a third user posts a message in a group chat room that includes the first user and the second user; and the first user receives an email from a fourth user.

Upon completing their task, the first user may transmit a request (i.e., an important communications request) to the communications monitoring software 406. In an example, the important communications request may be transmitted in response to the first user exercising a user interface control (e.g., a hyperlink or an action button) in a user interface of the software platform 402. In the response to the important communications request, the communications monitoring software 406 presents to the user a recommended action to contact the second user.

The notification may include an importance reason. To illustrate, the first user may be previously identified the second user as a relationship target (further described below). Thus, the importance reason can essentially state, "you received an email (titled: <title>) from the second user whom you have a tagged as a relationship target)," where <title> is a placeholder to be replaced with the actual subject of the email. It is noted that any text string herein of the form <placeholder> is a placeholder that the communications monitoring software 406 would replace with an actual value. The notification may also include a recommended modality.

In another example, the second user may be considered to be a trusted user (further described below) with respect to the first user. The second user may be a project leader, a manager, an executive, a mentor, or have some other designated organizational relation to the first user that identifies the second user as a trusted users with respect to the first user. The organizational relation may be obtained or determined based on data in the data store 404 or by querying some other system or software that may be separate from the server device 400.

The recommended action can also include a recommended modality. For example, the recommended action can included a recommendation modality or an action therefor that essentially states "Chat with the second user." That is, the communications monitoring software 406 may determine that, even though the communication received from the second user is an email, the first user is recommended to respond with a chat message. The recommended modality may be or correspond to an identified preferred modality of the second user. The communications monitoring software 406 may determine that the second user may prefer chat over any other communication modality, that most communications between the first user and the second user take place over chat, or that the second user has set a preference indicating that chat is their preferred communication modality. The communications monitoring software 406 may determine the preferred communication modality of the second user based on other criteria.

In an example, the communications monitoring software 406 can identify and recommend communications actions that are likely to result in improved relationships between users. As already mentioned, a first user may be designated as a relationship target for a second user. The communications monitoring software 406 can identify communication actions for the second user. The communication actions are such that if they were performed by the second user, the relationship between the first and the second user is likely to be improved (i.e., strengthened).

That a relationship is strengthened can include that a communications score between the first and the second user is increased. That is, the communications monitoring software 406 correlates increased communication scores of communications between two users with improved relationships between the two users. As described herein, communication scores can be obtained (e.g., determined or calculated) using or based on communication feature scores.

Figure 5:
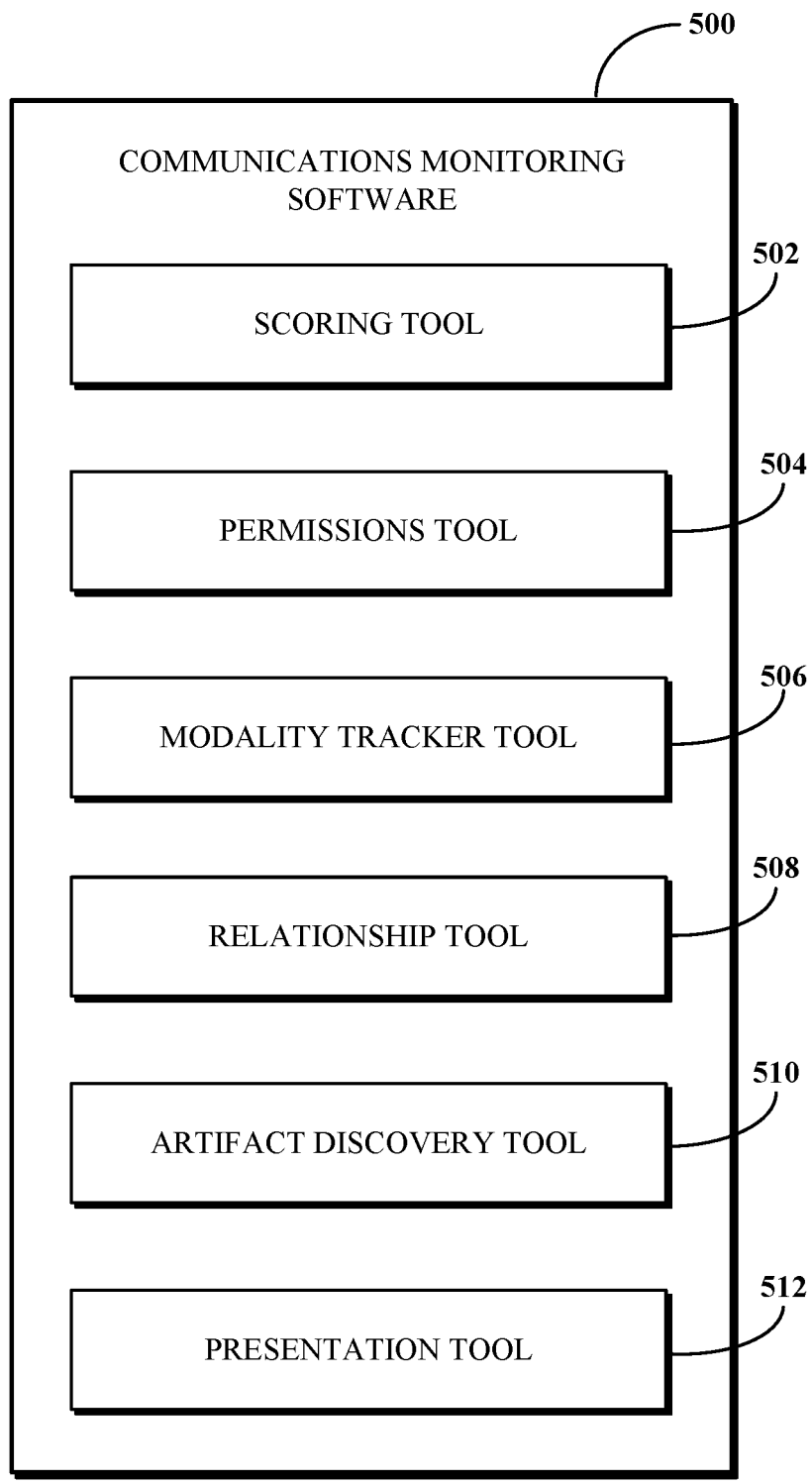
FIG. 5 is a block diagram of example functionality of communications monitoring software.

FIG. 5 is a block diagram of example functionality of communications monitoring software 500, which may be the communications monitoring software 406 of FIG. 4. The communications monitoring software 500 includes tools, such as programs, subprograms, functions, routines, subroutines, operations, executable instructions, and/or the like for, inter alia and as further described below, selective multimodal and channel alerting of missed communications, user-aware communication feature identification, or both.

At least some of the tools of the communications monitoring software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the communications monitoring software 500 includes a scoring tool 502, a permissions tool 504, a modality tracker tool 506, a relationship tool 508, a artifacts discovery tool 510, and a presentation tool 512. In some implementations, the communications monitoring software 500 can include more or fewer tools. In some implementations, some of the tools may be combined, some of the tools may be split into more tools, or a combination thereof. Which tools may be available in communications monitoring software 500 may depend whether the communications monitoring software 500 is available at a user device, such as the user device 408 of FIG. 4 or a server device, such as the server device 400 of FIG. 4. Statements herein such as "a tool/software/etc. of a user" should be understood to mean "a tool/software/etc. that is executing or is available at a user device of the user."

The scoring tool 502 may assign scores to communications, assign scores to respective features to the communications, or a combination thereof. For example, given a communication, the scoring tool 502 may identify communication features of the communication, assign respective communication features scores to the communication features, and then assign a communication score to the communication based at least in part on the communication features scores. In an example, the communication score of a communication may be a sum of the communication features scores of the communication features of the communication.

A communication feature of a communication can be any aspect of the communication that can be used by the communications monitoring software 500 to identify important communications, recommend communication actions or features, evaluate a relationship strength, or a combination thereof. Communication features of a communication may be determined and scored for (e.g., with respect to or from the point of view of) each user of the communication. A user of a communication may be a recipient, a sender, a viewer, an observer, a participant in, a contributor to, or a user that may play another role with respect to the communication, or a combination thereof.

Examples of communication features include, but are not limited to, whether a user virtually participated in a meeting or event, whether the user physically attended a meeting, whether the user spoke directly to someone, whether the user spoke to an audience, whether the user turned on a camera in a video conference, a duration of the camera being on in the video conference, whether the user spoke at a meeting, whether the user sent a chat message during a meeting, the number of words in chat messages sent or received by the user, whether the user sent an email, whether the user chatted with another user outside of a meeting, whether the user shared content (e.g., documents or whiteboard) in a meeting, whether the user is determined to be listening (i.e., is being attentive to another participant in a meeting), or whether the user made eye contact with other meetings participants.

Additional communication features include the type of the communication modality or channel (e.g., telephone, chat, email, meeting, or in-person), meeting information (e.g., whether a meeting ended on time or overran the scheduled time), a frequency of meetings between certain groups of users that include the user, whether the communication is from an trusted user, a geolocation of a meeting, a time-zone of a meeting. Communication features may also include, be based on, or derived from artifacts related to communications. Such artifacts may include documents exchanged during communications, transcripts, or calendar data that may be shared or be similar between users. Other communication features are also possible.

A communication feature score may be assigned to a communication feature based on a duration of the communication, based on a condition related to the feature (such as whether the feature is enabled to not), or some other criteria. The identified communication features (e.g., data related thereto), their respective scores, and the communication scores can be stored in the data store 404.

Sentences herein such as "the scoring tool 502 records <an event or feature>" should be understood to mean that the scoring tool 502 creates or saves a communication feature (i.e., data descriptive thereof) as entries in a data store (such as the data store 404 of FIG. 4) corresponding to the event or feature. While certain scores and ranges of the scores are used herein, the disclosure is not so limited and any scores, ranges, and techniques of combining the communication feature scores can be used.

In an example, higher scores can be used for communication features that are predetermined to be more engaging to users than other communication features. That is, the scoring tool 502 may include data (e.g., a data structure, a lookup table, logic, or rule) that identify ranks and scores for communications features based on respective and relative predetermined engagement levels. To illustrate, the scoring tool 502 may be configured such that a video conference is more engaging than a telephone call; a telephone call is more engaging than a chat message; a camera being turned on in a video conference is more engaging than not turning on the camera; in-person conferences or meetings are more engaging than video conferences; and so on.

Illustrations of operations of the scoring tool 502 are now provided.

In a first scoring example, a communication between a first user and a second user may be a one-on-one video-conference meeting. The scoring tool 502 may record a communication feature corresponding to the modality of the meeting (i.e., a video-conference meeting). The scoring tool 502 may record respective timestamps of the first user and the second user joining the meeting. During the meeting, the first user turns on their camera. The scoring tool 502 may record the event (i.e., the turning on of the camera by the first user) as a communication feature. The scoring tool 502 may also record a timestamp of the time that the camera was turned on. The scoring tool 502 may also record a fact indicating that the interaction modality is "camera on" or "video on." The scoring tool 502 may record a communication feature indicating that the second user spoke for 2 minutes during the 10 minute meeting. The scoring tool 502 may record that the camera of the second user is turned off. The scoring tool 502 may record that the first user continually looked into the camera while the second user was speaking. As such, the scoring tool 502 may also determine and record that the first user was attentive and a degree of attentiveness of the user to the second user. The degree of attentiveness can be measured as a ratio of the time that the first user was looking at the camera to the time that the second user was speaking. The scoring tool 502 may also record additional communication features. It is noted that at least some of these communication features may be determined or extracted from the communication after the meeting is completed.

After the completion of the meeting, the scoring tool 502 may score the recorded communication features. Statements herein such as "the scoring tool 502 assigns a score to the communication" should be understood to mean that the scoring tool 502 assigns a communication feature score to a described communication feature of the communication and that the communication feature score is added to the cumulative score of the communication. To illustrate, assume that "the scoring tool 502 assigns a score of 5 to the communication since the communication was a chat message and assigns a score of 2 since the response to a message was only 2 words." As such, the total communication score may be 7, which is a combination (in this case, a sum) of the two communication features scores, 5 and 2.

The communication may be assigned a score based on a number of attendees in the meeting. The score can be inversely related to the number of attendees. As the meeting included only two participants (i.e., the minimum number of participants), the scoring tool 502 may assign a highest score to the communication (e.g., 100 points). The scoring tool 502 may assign a score to the communication based on the duration of the meeting. To illustrate, the scoring tool 502 may assign a score of, say, 100 points for a meeting duration of 10 minutes. As the camera of the first user was turned on for 100% of the duration of the meeting, the scoring tool 502 may assign a highest score to the meeting (e.g., 100 points). As the second user spoke for 2 out of the 10 minutes, the scoring tool 502 assigns a score of 20 (=0.2*100) the communication. As the first user focused during the entire meeting, the scoring tool 502 assigns a score of 200 to the communication. As the second user did not turn their camera on, the scoring tool 502 assigns a negative score (e.g., −200) to the communication.

The scoring tool 502 may then obtain a communication score for the communication based on the scores assigned to the identified communication features. The communication score can be a weighted sum of the individual communication feature scores. In an example, the weighted sum can use equal weights (e.g., 1). As such, the meeting communication score in the first scoring example is 270. As already described, the scoring tool 502 may record the communication feature scores of each communication feature and the score of the communication along with the users (i.e., identifiers therefor) and date of the communication in a data store.

In a second scoring example, a first user sends a chat message to a second user. The second user responds in less than one minute. The first and the second users exchange messages for five minutes with responses being sent in less than one minute each. The number of words in each of the responses is greater than four words. In response to detecting (e.g., determining or inferring) an end (e.g., a completion) to the communication, the scoring tool 502 may score the communication. The communication may be determined to be completed in response to determining that neither party sent a message within a threshold amount of time.

The scoring tool 502 may assign a score to the communication based on determining that the communication is a one-to-one communication. However, as a chat message has a lower impact than, for example, a video meeting, the scoring tool 502 assigns a score that is smaller than the meeting in the first scoring example. To illustrate, the scoring tool 502 may assign 50 points to the communication based on the communication modality (or channel) being a chat. The scoring tool 502 may assign a score based on the response time. To illustrate, the scoring tool 502 may assign a score of 50 to the communication since responses were transmitted in less than one minute. The scoring tool 502 assigns a score based on a duration of the communication. To illustrate, the scoring tool 502 may assign a score of 50 since the communication lasted five minutes. The scoring tool 502 may assign a score based on the total number of words exchanged. To illustrate, the scoring tool 502 may assign a score of 50 points based on determining that a total of 50 words were exchanged.

As such, a total score of 120 may be assigned to the communication. As already described, the scoring tool 502 may record the communication feature scores of each communication feature and the score of the communication along with the users (i.e., identifiers therefor) and date of the communication in a data store. As already alluded to, smaller scores were assigned in the second scoring example than the first scoring example. This is so because the scoring tool 502 determines that the chat modality is less engaging than a meeting and that, as described with the relationship tool 508, meetings may result in stronger relationships between users than sending chat messages.

In a third scoring example, the scoring tool 502 may determine that a first user and a second user have just completed a communication that is an in-person encounter. The scoring tool 502 may determine that the first user and the second user have had an in-person encounter based on a proximity of the respective devices of the first user and the second user. For example, respective communications monitoring software within the devices of the first user and the second users may be able to detect (e.g., determine) device locations. The scoring tool 502 may determine that the encounter was a pre-scheduled meeting, which may be determined by examining respective calendar or meeting data of the first and the second users. The scoring tool 502 may determine that the encounter was an ad-hoc encounter. For example, if the scoring tool 502 determines that the devices of the first user and the second users were proximal (e.g., within 5 feet or some other threshold distance) and no data calendaring data (which may be data in the data store 404 of FIG. 4) indicates that the first and the second users were supposed to be a same meeting at the time of the encounter, then the scoring tool 502 determines that the encounter is an ad-hoc one.

As ad-hoc, in-person encounters are likely to strengthen relationships the most, the scoring tool 502 assigns a highest possible score (e.g., 400, or some other highest score) based on the modality of the communication. However for an ad-hoc, in-person encounter to be considered a communication to be scored, the encounter must have lasted at least a minimal threshold duration (e.g., 3 minutes). A feature of the communication can also be the length of the encounter. A communication feature score may be assigned based on the duration. Similarly, scheduled, in-person encounters are also likely to strengthen relationships albeit to a lesser extent than ad-hoc, in-person encounters. As such, the scoring tool 502 assigns a next highest possible score (e.g., 350, or some other next highest score) to the communication.

The permission tool 504 determines the users with respect to whom communications may be scored. In an example, the permission tool 504 may receive an indication from a user granting the communications monitoring software 500 permission (e.g., access) to access at least certain types of communications (i.e., communications received via certain channels or modalities) of the user. That the communications monitoring software 500 is or is not granted permission for certain types of communications can mean that the other tools of the communications monitoring software 500 can or cannot perform, respectively, their respective processing described herein with respect to the communications of the certain types.

In an example, that the communications monitoring software 500 is granted permission to access certain types of communications of a user can include that communications features that are related to the user may be obtained by the scoring tool 502 from communications of the user. To illustrate, a user may grant permission to access video meetings of the user. As such, the scoring tool 502 can identify communication features (e.g., that the camera of the user was or was not turned on during video conferences). On the other hand, the user may not grant permission to access chat messages. As such, the scoring tool 502 may not determine, for example, numbers of words in messages of the user or that the user transmitted any chat messages.

In an example, that the communications monitoring software 500 is not granted permission to access certain types of communications of a user can include that no communications of the certain types that directly address (i.e., are specifically addressed to or specifically name) the user are processed by the scoring tool 502. As such, a communication between a first user, who did not grant permission, and a second user would not be scored by the scoring tool 502 for neither the first user nor the second user.

In an example, that the communications monitoring software 500 is granted permission to access a certain type of communications of a user can include that a repository that includes communications of the certain type can be accessed by the other tools of the communications monitoring software 500 to perform processing described herein with respect to the communications.

The modality tracker tool 506 identifies preferred communication modalities of users. The preferred communication modalities of a user can be used to provide recommended modalities for other users for communications that require human interaction. Given a user, the modality tracker tool 506 may monitor communications of the user to identify the communication modalities of the user. Monitoring communication of the user can mean or include identifying (e.g., counting) the number times that the user has engaged with available communication modalities (e.g., chat channel, telephone, meetings, email, and so on). As such, the modality tracker tool 506 may maintain respective numbers of communications transmitted by the user using certain modalities or channels. In an example, the modality tracker tool 506 can alternatively, or additionally, identify preferred communication modalities of a user based on whether the user responded, how promptly the user responded, other criteria, or a combination thereof to communications received using the different available modalities. In an example, those least used by the user may not be identified as preferred communication modalities.

Identifying preferred communication modalities of a user is premised on the assumption that users are more likely to respond to communications they receive in their preferred communication modalities and may not even notice that they received communications in other communication modalities or channels. As such, knowing the best way in which a user communicates based on previous communications can be used to guide future communications with the user.

To illustrate, preferred communication modalities may be based on group culture and norms. For example, whereas users in a research and development (R&D) department may prefer sending chat messages, users in a legal department may prefer email. Thus, a first user of the R&D department may send a chat message to a second user of the legal department. However, the first does not receive a response. It may be fruitless for the first user to continue to send chat messages requesting a response from the second user.

Rather, the modality tracker tool 506 may determine that the preferred communication of the second user is email. The communications monitoring software 500 may determine that the second user has not responded to the first user and may recommend a follow up action (i.e., a recommended action) with the second user where the follow up action includes a recommended modality that is the preferred modality of the second user. To illustrate, the recommended action, which may be presented to the user by the presentation tool 512, may essentially state "the second user has not responded to you in <days> days to the chat message you sent on <date>. You are likely to get a response if you send the second user an email." The recommended action may include a user interface control that enables the first user to email the second user.

The modality tracker tool 506 may also determine preferred communication modalities for pairs of users and groups of users. For example, the modality tracker tool 506 may determine that, even though a first communication modality (e.g., email) is preferred by a first user, the first user more frequently responds to a second modality (e.g., chat) communications from a second user. As such, the second communication modality is presented to the second user with respect to communications with the first user; and the first communication modality may be presented to other users.

The modality tracker tool 506 may determine a preferred communication modality based on a number of people in a communication. To illustrate, a communication may be an email that includes five recipients. The modality tracker tool 506 may identify, such as by examining data relating to communications between the users, that these five recipients typically have two meetings per week. As mentioned, the data relating to communications may be data stored in a data store, such as the data store 404 of FIG. 4. As such, a recommended modality for responding to the communication may be a meeting and an action to schedule a meeting may also be presented along with the recommended modality.

In an example, the modality tracker tool 506 may identify a recommended modality based on a current context of the user with respect to whom the recommended modality is identified. For example, the modality tracker tool 506 may determine that the preferred modality of the user is the telephone but that the user is currently in a meeting. As such, the user is not likely to respond to a telephone call while in a meeting and the modality tracker tool 506 may identify a second communication modality that may be less disruptive to the current context of the user. For example, the modality tracker tool 506 may identify a second most preferred communication modality to recommend to another user for currently responding to a communication from the user.

In an example, the modality tracker tool 506 may, additionally or alternatively, identify the preferred modality of a first user as a recommended modality for a second user and may indicate a time after which the preferred modality can be used. To illustrate, the communications monitoring software 500 (i.e., the presentation tool 512 therein) may essentially indicate to the second user that "the first user is currently in a video meeting. You can call them after <available time>."

In an example, the modality tracker tool 506 may include rules that identify recommended modalities that would not conflict with a current context of, or disrupt, a user. The rules may be of the form "if the current context of a user is determined to be <X>, then the recommended modality should be <Y>."

In an example, the current context of a user may be determined using calendar data, which may be stored in a data store that may be associated with the communications monitoring software 500 (such as the data store 404 of FIG. 4), a calendaring system or store that may not be associated with the communications monitoring software 500, or both.

Turning now to the relationship tool 508, as mentioned, a first user may be designated as a relationship target for a second user. The relationship tool 508 identifies and presents to the second user (via the presentation tool 512) relationship strengtheners that the relationship tool 508 determines are likely to strengthen the relationship between the second user and the first user, if performed by the second user. Relationship strengtheners can include communication modalities, communication actions, communication features, other types of relationship strengtheners, or a combination thereof. That is, knowing the relationship targets of a user (e.g., relationships that the user aspires to build or that may be organizationally present), the relationship tool 508 can be used to reinforce such relationships with relationship strengtheners. The relationship tool 508 may use data obtained by the scoring tool 502, such as communication features and communication scores, to identify the relationship strengtheners.

To illustrate, the relationship tool 508 may determine that communications (e.g., modalities and respective frequencies therefor) between the second user and the first user do not lead to an improved relationship between the second user and the relationship target (i.e., the first user). For example, the relationship tool 508 may detect that from a time that the first user was designated as a relationship target for the second user, the two users communicated (e.g., held video meetings) weekly, but that the two users have not communicated in the last three weeks. As such, the relationship tool 508 may present a relationship strengthener to the second user that essentially states, "you used to regularly meet with the first user; but have not in a while. You might want to set up a meeting."

In another example, the relationship tool 508 may determine whether the second user has had at least a predetermined number of one-on-one communications with the relationship target (i.e., the first user) and, if not, the relationship tool 508 may recommend a relationship strengthener to the second user. To illustrate, the relationship tool 508 may present a message to the second user essentially stating, "you haven't communicated sufficiently with the first user."

In another example, the relationship tool 508 may use other communication features and scores determined by the scoring tool 502 to recommend additional relationship strengthener. For example, based on the number of words of previous communications, whether the camera of the second user was turned on, and the number of attendees in previous meetings, the relationship tool 508 may present one or more messages to the second user essentially stating, "you haven't been saying much in your communications with the first user," "when you've met with the first user, your camera has not been on—remember to turn it on," and "you've been in meetings with the first user where at 5 other people have been present—consider setting up a 1-1 meeting with the first user," respectively.

In an example, a target relationship score may be associated with (e.g., assigned to) a relationship target. The target relationship score may be set by the user, may be set by a third user (such as a supervisor of the user), or may be set any other way. An accumulated relationship score may also be associated with the relationship target based on (e.g., sum of) communications scores between a user and a relationship target therefor. The accumulated relationship score can be a measure of the relationship strength (i.e., level) between the user and the relationship target. The relationship tool 508 may determine that a relationship between a user and a relationship has reached a desired relationship level when the accumulated relationship score is at least equal to the target relationship score. If no target relationship score is associated with a relationship target, then the target relationship score may be set to a default target relationship score, which may be maintained by (e.g., stored in association) the relationship tool 508.

A user may obtain from the relationship tool 508 a list of the target users for the user, which the presentation tool 512 may present to the user. The list may be sorted according to the respective relationship strengths with the target users. A relationship strength between the user and a target user may be computed as a sum of all communication scores between the user and the target user. In an example, the list may include sums of scores by communication features between the user and the target users. As such, the user may be able to sort the list (in ascending or descending order) by communication feature scores of certain features. To illustrate, by so ordering the list, the user may be able to determine that the user practically never turns on their camera while communicating with a first user but always turns on their camera when communicating with a second user.

The artifacts discovery tool 510 can identify artifacts or interests (collectively, artifacts) common to trusted users. Identifying common artifacts can enable improved relationship between users. The artifacts discovery tool 510 may maintain, for users, respective trusted users. A trusted user with respect to (e.g., for or of) a user can be another user with whom the user has successfully communicated. That is, the user may have sent a communication to the other user and received a response or a communication back. In response to identifying a common artifact between two or more trusted users, the artifacts discovery tool 510 can notify (e.g., transmit a notification to) the two or more trusted users of the common artifact.

The artifacts discovery tool 510 may designate members of certain groups as trusted users for a user. For example, members of the same team (e.g., organizational group) of a user may be designated as trusted users; other members of groups that a user is a member of may also be designated as trusted users. A group may be an email distribution list, a project team, or a list of users invited to a recurring meeting. Other ways of identifying groups are possible.

Artifacts identified by the artifacts discovery tool 510 may include documents (such as documents shared in chat rooms or in public repositories), document summaries, comments, chat channels, recordings (such as of meetings), whiteboard contents, meetings (scheduled or completed), events (schedule or completed), contact details, preferred communication modalities, other artifacts, or a combination thereof. Identified documents can include documents that are shared in chat rooms, In an example, the artifacts discovery tool 510 may identify a document that two mutually trusted users (i.e., one user is a trusted user for the other) have access to and that the two users are determined to have shared interests that are common with the document. For example, the shared interest may be discussed in the document. The two users may be determined to have shared interests based on calendar data (e.g., examining titles and content of meeting invites on the respective calendars of the users or attachments thereto). The artifacts discovery tool 510 may determine that the respective calendar data of the two users are the same or equivalent. The artifacts discovery tool 510 may analyze the content of the document and determine that the respective calendar data are common with the document. Natural language processing (NLP) tools or algorithms can be used to identify main themes in the document and to determine that at least some of the main themes are common with (e.g., similar to) the shared interests.

In another example, two mutually trusted users may be communicating (e.g., emailing or chatting) about a topic, the artifacts discovery tool 510 may identify a document related to the topic and which is accessible by the two users. As such, the artifacts discovery tool 510 may present a notification to the users that essentially states, "A document you both have access to about <topic> was created by <creator> on <date>."

In another example, the artifacts discovery tool 510 may identify and present to a user one or more of documents (e.g., links thereto, locations thereof, or metadata therefor), events, projects, or chat channels that a trusted user of the user may have access to or has participated in.

The presentation tool 512 displays, causes to be displayed, or generates for display user interfaces at user devices, such as the user device 408 of FIG. 4. The presentation tool 512 may present the user interfaces in response to requests from users, as directed by the tools 502-510, as described herein.

While this disclosure is described with respect to traditional communication modalities, the disclosure is not so limited. Some of the communications that are within the scope of communications described herein include communications that may take place in a virtual space, in an augmented reality space, or in a space that may be referred to as a metaverse or a cyberspace. Additionally, while this disclosure refers to communications between a first user and a second user. The disclosure is not so limited. For example, a communication may be between a first agent (e.g., a first virtual avatar) of the first user and a second agent (e.g., a second virtual avatar) of the second user. As such, a communication in a virtual reality space between a first avatar and a second avatar can be communication within the scope of this disclosure. Such communication may also be scored by the scoring tool 502.

Figure 6:
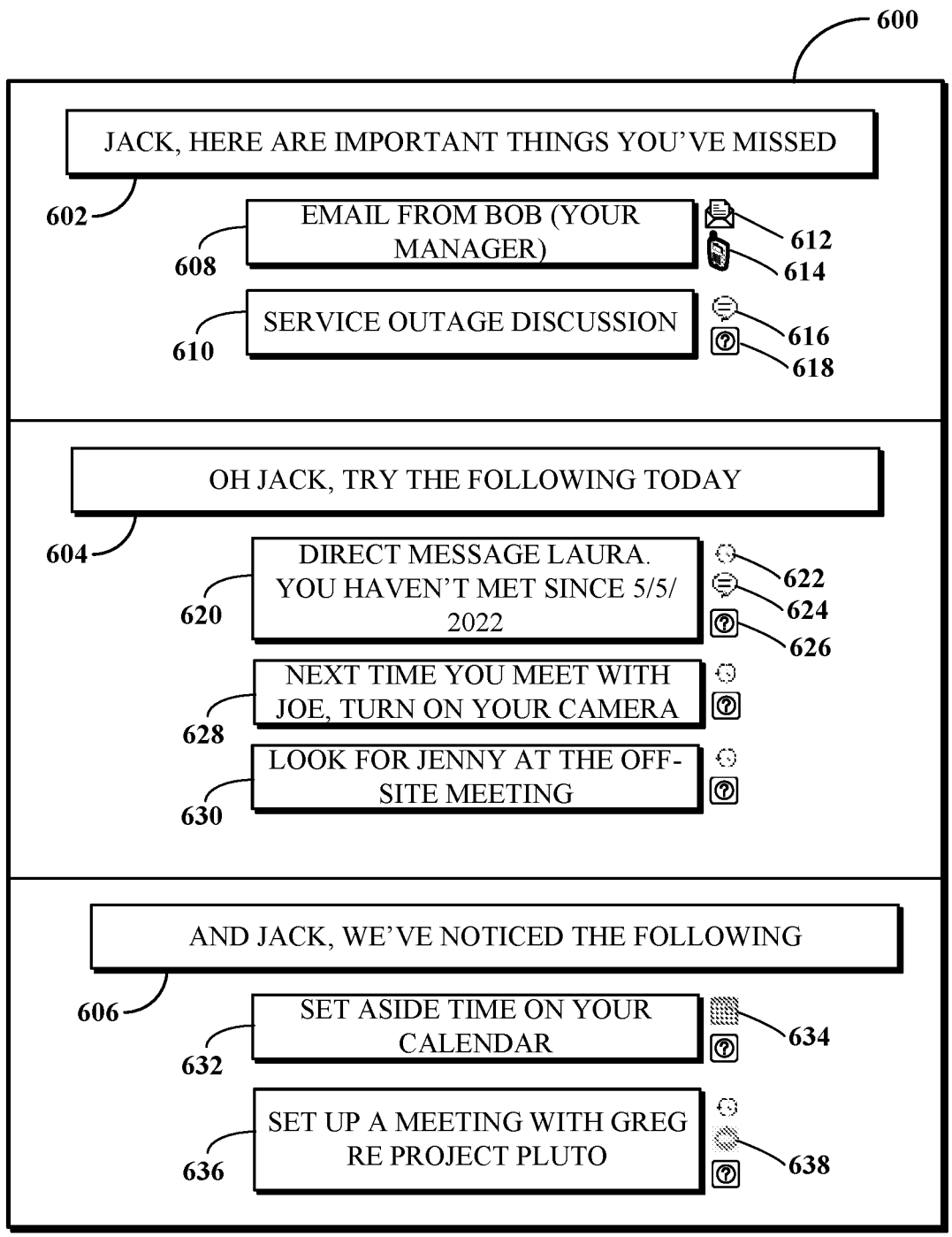
FIG. 6 is an illustration of a user interface that may be generated by a communications monitoring software.

FIG. 6 is an illustration of a user interface 600 that may be generated by a communications monitoring software. The communications monitoring software can be the communications monitoring software 406 of FIG. 4, the communications monitoring software 500 of FIG. 5, or a tool therein. The user interface 600 may be presented to a user on a user device of the user, such as the user device 408 of FIG. 4. The user interface 600 may be referred to as a communications summary.

The user interface is shown as including three sections; namely sections 602-606. However, the disclosure is not so limited. More or fewer sections may be included in the user interface 600. Additionally, user interfaces (i.e., controls, layouts, or contents therein) according to this disclosure are not limited by the specific user interface shown in FIG. 6. The user interface 600 can include different types of recommendations, as further described below. For brevity, statements herein similar to "a section of the user interface 600 includes an object" should be interpreted to mean that "the section of the user interface 600 includes an user interface representation, description, or summary of the object, which may be maintained at the server."

The section 602 can include important communications that the user may have missed. The section 602 is shown as including two important communication. However, more or fewer important communications may be shown. An important communication 608 may be identified as such based on the sender of the communication (i.e., the manager of the user). An important communication 610 may be identified as such as described above with respect to the first illustrative example of the operations of the communications monitoring software 406 of FIG. 4.

A control 612, when invoked by the user, may enable the user to view the missed communication. A control 614, when invoked by the user, may enable the user to respond to the communication using a preferred modality of the sender (i.e., the manager) of the communication. The control 614 indicates that, even though the important communication 608 was an email, the recommended modality to respond to the communication is a telephone. A control 616 enables the user to review the specific chat posting that resulted in the identification of the important communications 610. A control 618 (i.e., an "ask why" control) may enable the user to query the communications monitoring software to provide an explanation as to why the communications monitoring software identified the important communications 610 from amongst received communications as an important communication.

The section 604 includes relationship strengtheners identified for the user. The section 604 includes three relationship strengtheners. However, the section 604 may include more or fewer relationship strengtheners. A relationship strengthener 620 indicates to the user that they have not communicated with a user named Laura (i.e., a relationship target) in a while and recommends that the user do so. A control 622 enables the user to view a history of communications, communication features, of both between the user and Laura. A control 624 enables the user to perform the recommended actions (i.e., "direct message" Laura). The control 624 may enable the user to communicate with Laura using a preferred modality identified for Laura, which may be a preferred modality of Laura for communicating with the user. A control 626 (i.e., an "ask why" control) may enable the user to query the communications monitoring software to provide an explanation as to how the communications monitoring software identified the relationship strengthener 620. In an example, the relationship strengthener 620 may include a suggestion for an in-person meeting based on respective physical locations of both users and, if a physical meeting is not possible, the relationship strengthener 620 may include a suggestion to schedule a catchup time based on availability of the users, which may be determined using calendar data of the users. The relationship strengthener 620 may include controls that enable such actions.

A relationship strengthener 628 indicates to the user to turn on their camera when they meet with the relationship target user named Joe. The relationship strengthener 628 indicates to the user to seek the relationship target user named Jenny. The communications monitoring software may have determined, using calendaring information, that both the user and Jenny will be at a meeting named "Offsite Meeting" and recommends the relationship strengthener ad-hoc, in-person interaction. In another example, the communications monitoring software may determine, using geolocations during mutual working hours, that both the user and Jenny are in sufficient proximity of each other. As such, the user can be prompted to message Jenny to request an ad-hoc meeting.

The section 606 may include aspects that may be derived based on monitoring and analyzing communications of the user. A notification 632 may be generated in response to determining that the user has been in many meetings, has been sending too many communications throughout the day, some other determination that the user is not having sufficient think time, or a combination thereof. As such, via the notification 632, the communications monitoring software may indicate to the user to set aside self- or think-time. A control 634 may enable the user to block time on the calendar of the user so that the user may not be disrupted during that time. By examining calendar data of the user, the monitoring software can identify a range of time that the user can set aside.

A notification 636 indicates to the user to follow up with a user named Greg regarding the topic "PROJECT PLUTO." The communications monitoring software may identify that documents the user and the user named Greg were jointly editing or exchanging one or more documents relating to PROJECT PLUTO, that they exchanged chat messages regarding PROJECT PLUTO, or the like. However, such communications may have seized. As such, the notification 636 reminds the user to set up a meeting with Greg regarding the topic. A control 638 enables the user to schedule a video conference with the user Greg.

In an example, the communications monitoring software may determine that the user had accepted and has attended occurrences of a recurring meeting with the camera turned off and the audio muted. As such, the section 606 may include a notification recommending that the user attend future occurrences of the meeting while taking a walk and to attend via their phone.

While not specifically shown in the user interface 600, at least some of the recommendations (i.e., at least some of important communication 608, 610, the relationship strengthener 620, 628, 630, or the notification 632, 636) may include respective controls that enable the user to indicate to the communications monitoring software to stop monitoring for and producing the suggestion. To illustrate, with respect to the notification 636, PROJECT PLUTO may have terminated; with respect to the relationship strengthener 628, the user may believe that their relationship with Laura has been established and therefore does not need further strengthening.

In an example, the modality tracker tool 506 of FIG. 5 may receive from a user a preferred modality (i.e., a user-configured preferred modality). When recommending communication modalities, the communications monitoring software 500 can alternatively or additionally include the user-configured preferred modality to any other recommended modality that is as described herein.

In an example, respective feedback controls may be associated with at least some of the important communications, the relationship strengtheners, and the notifications (collectively, summaries) of the user interface 600. A feedback control may enable the user to indicate a like or dislike of the summary. One of more feedback controls may enable the user to indicate to the communications monitoring software that the user is no longer interested in receiving a summary of a particular type or summaries with respect to another user indicated in a summary. The communications monitoring software can use the feedback from the user in determining the communications to monitor (e.g., score) and summaries to present to the user.

Figure 7:
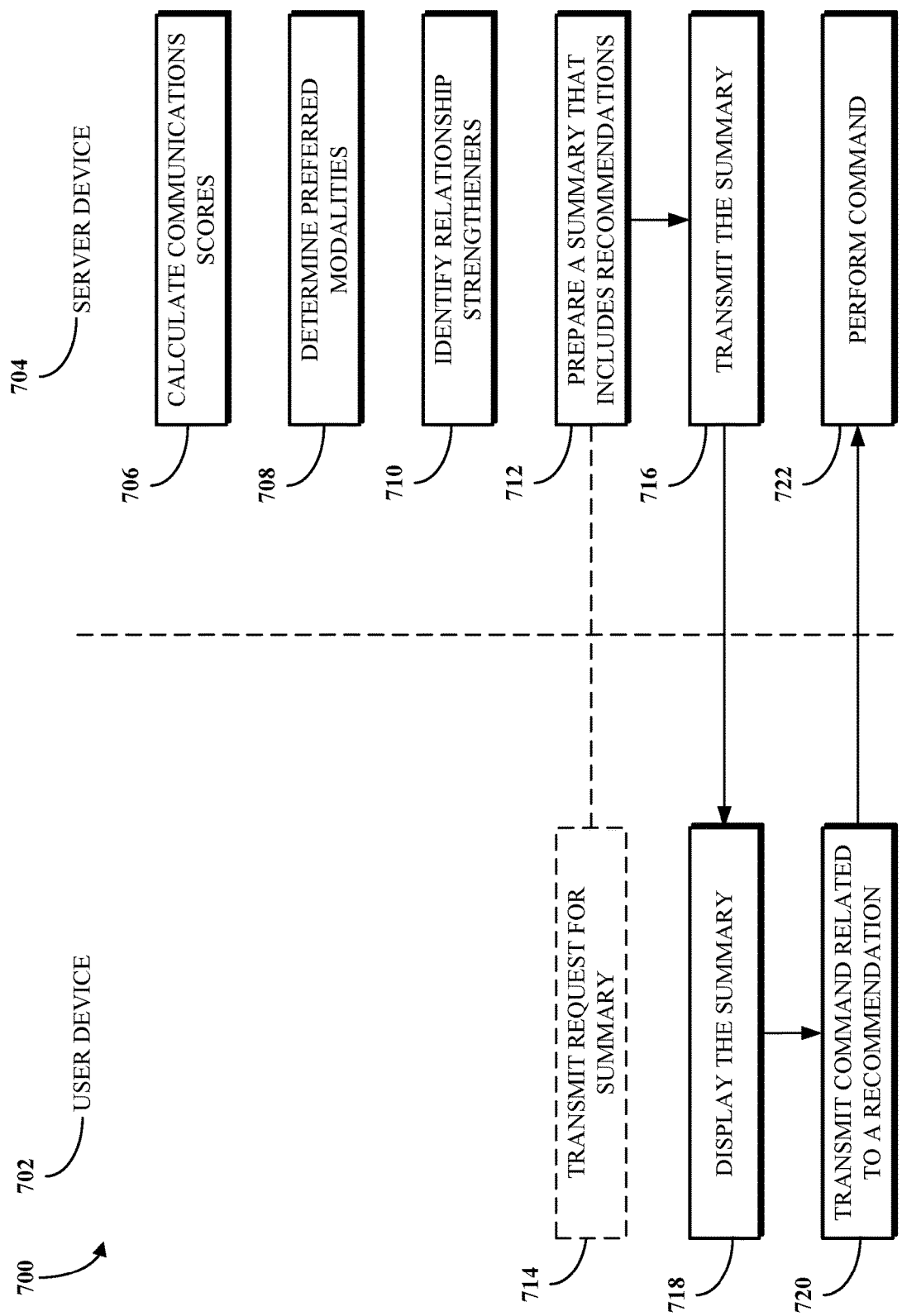
FIG. 7 is an example of an interaction diagram for generating communication summaries.

FIG. 7 is an example of an interaction diagram 700 for generating communication summaries. The interaction diagram 700 illustrates that a user using a user device 702 uses communication services of a server device 704, which includes a conferencing software platform, such as the software platform 402 of FIG. 4, which in turn includes a communications monitoring software, such as the communications monitoring software 406 of FIG. 4. Devices of other users who may communicate with the user of the user device 702 are not shown.

At 706, communications scores are calculated or obtained. Obtaining communications scores can include assigning scores to features of the communications. The communications scores and the communications features scores can be obtained by a scoring tool of communications monitoring software, such as described with respect to the scoring tool 502 of FIG. 5. At 708, preferred modalities of users of communications are determined. The preferred modalities can be determined by a modality tracker tool of the communications monitoring software, such as described with respect to the modality tracker tool 506 of FIG. 5. At 710, relationship strengtheners are identified. The relationship strengtheners can be identified by a relationship tool of the communications monitoring software, such as described with respect to the relationship tool 508 of FIG. 5. The relationship strengtheners are identified for a user with respect to other users identified as relationship targets of the user.

As shown in FIG. 7, processing at each of 706-710 can proceed independently of each other. In an example, the communications monitoring software may include services that operate according to respective schedules, in response to triggers or events, or both. To illustrate, the scoring tool may perform 706 in response to detecting a completion of a communication; on the other hand the relationship tool may perform 710 once per day. In another example, the processing of 706-710 can be sequential. That is, whenever one of 706-710 is performed, then the others of 706-710 are also performed.

At 712, a summary (i.e., a communications summary) that includes recommendations is prepared at the server device 704. The communications monitoring software of the server device 704 prepares the communications summaries. The communications summary can be as described with respect to the user interface 600 of FIG. 6. As already described, the communications summary may be automatically prepared and delivered to the user device, such as on a schedule or in response to an event. In another example, the communications summary may be prepared in response to the user, at 714, causing a request for the communications summary to be transmitted from the user device 702 to the server device 704.

At 716, the communications summary is transmitted to the user device. At 718, the communications summary is displayed at the user device. As described above, the communications summary may include controls usable by the user (such as one or more of the controls 612, 614, 618, 622, and so on). At 720, the user may invoke (e.g., perform or exercise) one of the controls, which in turn causes a command to be transmitted to the server device 704 to perform actions indicated by the control. The command transmitted can be related to a recommendation included in the communications summary. At 722, the action requested by the user is performed. At least some of the actions may be performed by the communications monitoring software of the server device 704.

Figure 8:
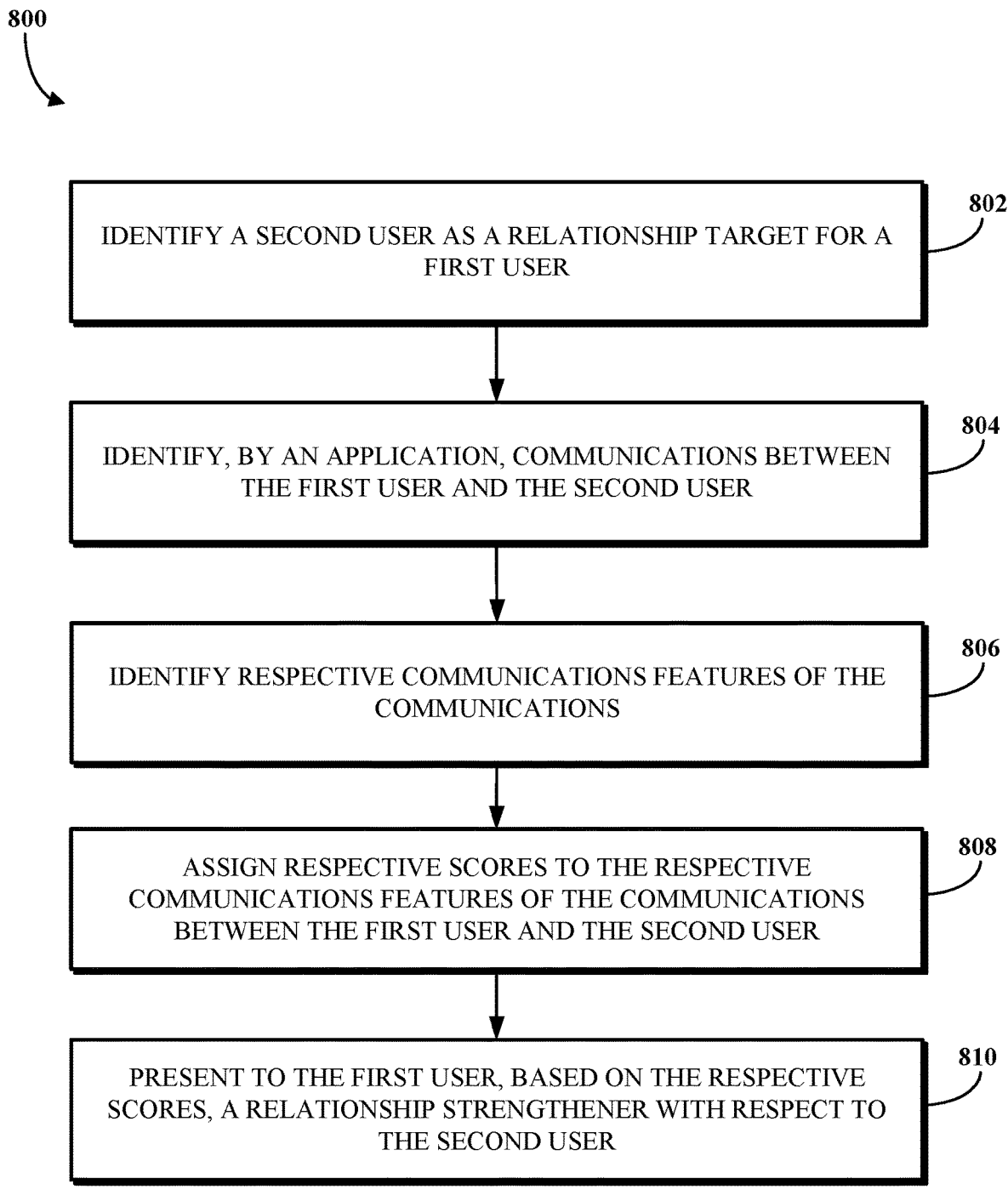
FIG. 8 is a flowchart of an example of a technique for user-aware communication feature identification.

To further describe some implementations in greater detail, reference is next made to examples of techniques which may be performed for selective multi-modal and channel alerting of missed communications, user-aware communication feature identification, or both. FIG. 8 is a flowchart of an example of a technique 800 for user-aware communication feature identification. The technique 800 can identify and recommend communication features that may improve relationships. The technique 800 can be executed using computing devices, such as the systems, hardware, and software described with respect to FIGS. 1-7.

The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof. The technique 800 can be implemented in whole or in part by a communications monitoring software, such as the communications monitoring software 406 of FIG. 4 or the communications monitoring software 500 of FIG. 5. The communications monitoring software may be available or executing at a target user device or a server device.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a second user is identified as a relationship target for a first user. The second user may be identified as a relationship target for a first user as described above. As such, in an example, the first user may identify the second user as the relationship target. In an example, the second user may be identified as the relationship target by a third user (e.g., a manager of the first user). In another example, the second user may be automatically identified as a relationship target based on group memberships of the first user and the second user. As such, identifying the second user as the relationship target for the first user can include identifying a group that includes the second user. In another example, identifying the second user as the relationship target for the first user can include identifying the second user as the relationship target for the first user in response to determining that the first user and the second user are members of a same group.

At 804, an application identifies communications between the first user and the second user. The communications can be identified as described above. In an example, the application can be configured with a permission to access communications of the second user including the communications between the first user and the second user. The permission and identifying the communications using the permission can be as described with respect to the permission tool 504 of FIG. 5.

At 806, respective communication features are identified for the communications. At 808, respective scores are assigned to the respective communications features of the communications between the first user and the second user. The respective scores can be assigned to the respective communications features as described with respect communications features scores assigned by the scoring tool 502 of FIG. 5.

In an example, a communication of the communications can be a chat-based communication and the respective communications features can include at least two of a number of users in the chat-based communication, a response delay time by the second user to a message transmitted from the first user in the chat-based communication or a respective number of words in messages received from the second user.

In an example, a communication of the communications can be identified as an in-person communication between the first user and the second user based on a proximity of a first device associated with the first user and a second device associated with the second user. For example, the technique 800 may receive location information from or about the first user device and the second user device, which the technique 800 can use to determine the proximity. For example, if the first user device and the second user device are determined to be within a threshold proximity, then the first and the second users may be determined to be in an in-person communication. In another example, if the first user device and the second user device are determined to each be within the threshold proximity of a third device, then the first and the second users may be determined to be in an in-person communication. To illustrate, the third device may be a device installed (e.g., positioned) in a conference room and the first user device and the second user device (e.g., communication software therein) may communicate with the third device, In an example, a communication can be a video-based communication and the respective communications features of the video-based communication can include at least two of a number of users in the video-based communication, whether the first user enabled a first video camera associated with the first user, a duration that the first video camera was enabled, whether the second user enabled a second video camera associated with the second user, a duration that the second video camera was enabled, a total amount of time that the first user spoke in the video-based communication, a total amount of time that the second user spoke in the video-based communication, a total focus time of the first user in the video-based communication, or a total focus time of the second user in the video-based communication.

In an example, a communication can be an audio only communication (such as a telephone to telephone communication) and the respective communications features of the audio based communication can include at least two of a number of users in the audio only communication, whether the first user enabled a microphone associated with the first user, a duration that the first microphone was enabled, whether the second user enabled a microphone associated with the second user, a duration that the second microphone was enabled, a total amount of time that the user spoke in the audio only communication, or a total amount of time that the second user spoke in the audio only communication.

At 810, a relationship strengthener with respect to the second user can be presented to the first user based on the respective scores. As described above, a relationship strengthener, if performed by the first user, may improve a relationship strength between the first user and the second user. In an example, the technique 800 may identify the relationship strengtheners in response to determining that an accumulated relationship score does not meet a target relationship score, as described above.

In an example, the technique 800 can include identifying, based on the respective communications features, inhibitors to improving the relationship between the first user and the second user. An inhibitor can be defined as a communication feature used by the first user but another related communication feature would be more effective at improving the relationship between the first user and the second user. Improving the relationship between the first user and the second user can mean increasing a score associated with the relationship between the first user and the second user. The inhibitors may be presented to the user. To illustrate, the relationship strengthener 628 of FIG. 6 may also include a message that essentially states, "you practically never turn on your camera when you meet with Joe."

In an example, the technique 800 may notify (e.g., recommend to) the first user of relationship strengtheners with the second user responsive to determining a decline in a relationship strength between the first user and the second user.

In an example, time series data of scores associated with the communications between the first user and the second user can be used to determine the decline in a relationship strength. The time series of the scores can be indicative of a trend of relationship strength between the first user and the second user.

Figure 9:
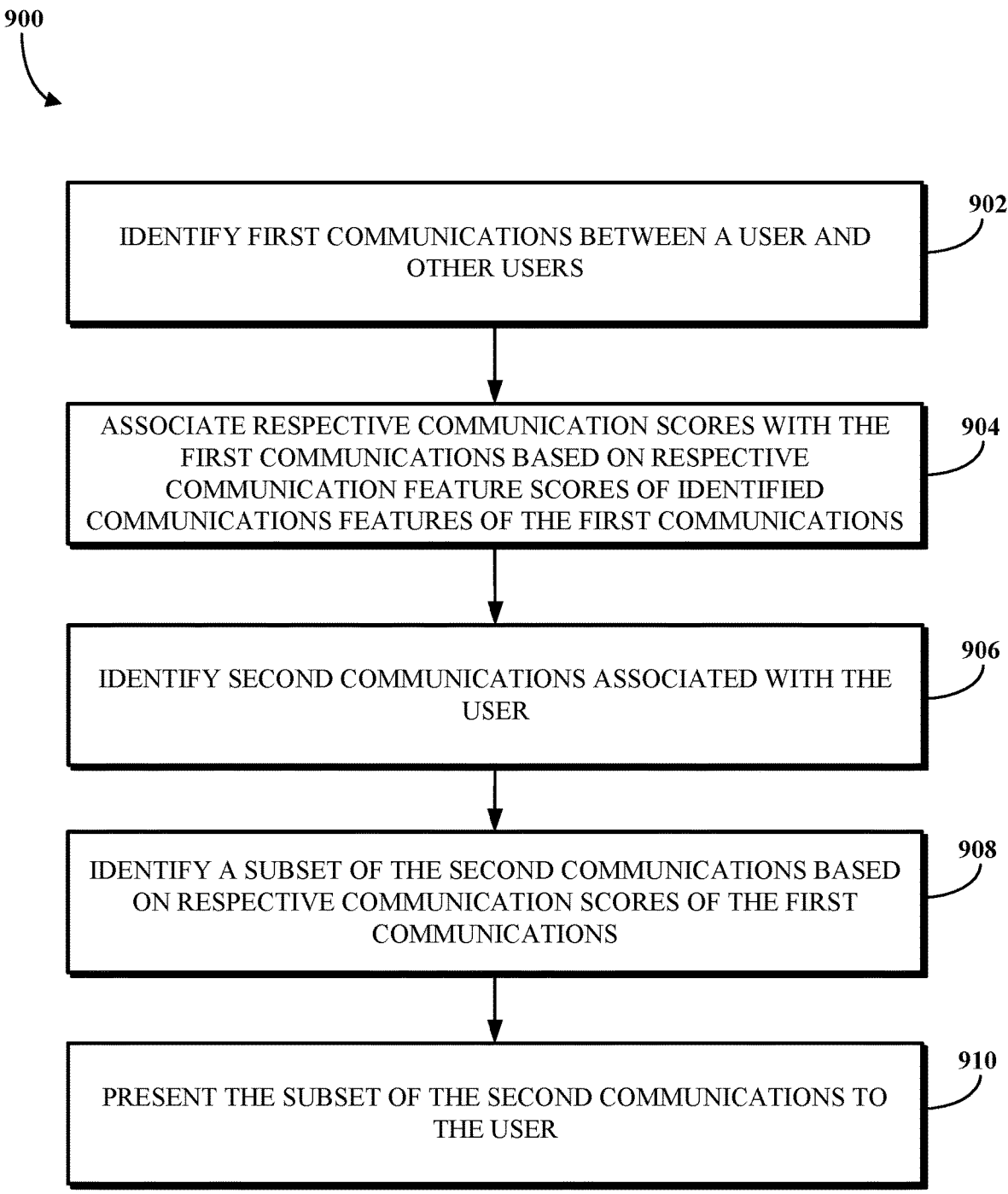
FIG. 9 is a flowchart of an example of a technique 900 for selective multi-modal and channel alerting of missed communications.

FIG. 9 is a flowchart of an example of a technique 900 for selective multi-modal and channel alerting of missed communications. The techniques 900 can identify important communications for a user. The technique 900 can be executed using computing devices, such as the systems, hardware, and software described with respect to FIGS. 1-7.

The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof. The technique 900 can be implemented in whole or in part by a communications monitoring software, such as the communications monitoring software 406 of FIG. 4 or the communications monitoring software 500 of FIG. 5. The communications monitoring software may be available or executing at a target user device or a server device.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, the communications monitoring application (or tool) identifies first communications between a user and other users. In an example, the first communications may be communications that are experienced by the user, as described above. In an example, the first communications may be identified based on configured permissions of the communications monitoring application. For example, communications monitoring application may be configured with permissions to access communications of at least some of the other users. In an example, the communications monitoring application can be configured with permissions to access at least some respective communication types of at least some of the other users. In an example, a communication of the subset of the second communications can be identified based on a sender of the communication. In an example, a communication of the subset of the second communications can be identified responsive to determining that the communication relates to a role of the user.

At 904, the communications monitoring application associates respective communication scores with the first communications based on respective communication feature scores of identified communications features of the first communications, such as described with respect to the scoring tool 502 of FIG. 5.

In an example, a communication of the communications can be a chat-based communication and the respective communications features can include at least two of a number of users in the chat-based communication, a response delay time by a second user to a message transmitted from the user in the chat-based communication or a respective number of words in messages received from the second user. In an example, a communication of the communications can be identified as an in-person communication between the user and a second user based on a proximity of a first device associated with the user and a second device associated with the second user. For example, the technique 900 may receive location information from or about the first user device and the second user device, which the technique 900 can use to determine the proximity.

In an example, a communication can be a video-based communication and the respective communications features of the video-based communication can include at least two of a number of users in the video-based communication, whether the user enabled a first video camera associated with the user, whether a second user enabled a second video camera associated with the second user, a total amount of time that the user spoke in the video-based communication, a total amount of time that the second user spoke in the video-based communication, a total focus time of the user in the video-based communication, or a total focus time of the second user in the video-based communication.

At 906, second communications associated with the user are identified. At 908, the communications monitoring application identifies a subset of the second communications based on respective communication scores of the first communications. That is, and as described above, the subset of the second communications includes those of the second communications that are determined to be important communications.

At 910, the subset of the second communications are presented in a user interface. The user interface can be similar to the user interface 600 of FIG. 6, or more specifically, the user interface can at least include a section that includes important communications, such as the section 602 of FIG. 6. In an example, the user interface can include, in association with a communication of the subset of the second communications, a communication modality for responding to the communication. The communicating modality can be different from a modality of the communication. In an example, the communication modality is based on a context of a sender of the communication, such as described above.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. As such, implementations of the described techniques may include hardware, a method or process, or computer software on a computer-accessible medium.

One general aspect includes a method. The method includes identifying, by a communications monitoring software, first communications between a user and other users. The method also includes associating, by the communications monitoring software, respective communication scores with the first communications based on respective communication feature scores of identified communications features of the first communications. The method also includes identifying second communications associated with the user. The method also includes identifying, by the communications monitoring software, a subset of the second communications based on the respective communication scores of the first communications. The method also includes presenting, in a user interface, the subset of the second communications to the user. Other embodiments of this aspect include corresponding computer systems, apparatus, and computer programs recorded on one or more computer storage devices, each configured to perform the actions of the methods. Implementations may include one or more of the following features.

The method where the communications monitoring software is configured with permissions to access communications of at least some of the other users. The communications monitoring software is configured with permissions to access at least some communication types of at least some of the other users. A communication of the subset of the second communications is identified based on a sender of the communication. Presenting, in the user interface, the subset of the second communications may include: including, in the user interface and in association with a communication of the subset of the second communications, a communication modality for responding to the communication, where the communicating modality is different from a modality of the communication, and where the communication modality is based on a context of a sender of the communication. A communication of the subset of the second communications is identified responsive to determining that the communication relates to a role of the user. A communication of the communications is identified as an in-person communication between the user and a second user based on a proximity of a first device associated with the user and a second device associated with the second user.

The method where a communication of the communications is a chat-based communication between the user and a second user, and where the respective communications features of the chat-based communication may include at least two of: a number of users in the chat-based communication; a response delay time by the second user to a message transmitted from the user in the chat-based communication; or a respective number of words in messages received from the second user.

The method where a communication of the communication is a video-based communication that includes a second user, and where the respective communications features of the video-based communication may include at least two of: a number of users in the video-based communication; whether the user enabled a first video camera associated with the user; whether the second user enabled a second video camera associated with the second user; a total amount of time that the user spoke in the video-based communication; a total amount of time that the second user spoke in the video-based communication; a total focus time of the user in the video-based communication; or a total focus time of the second user in the video-based communication.

The method where a communication of the communication is an audio only communication that includes a second user, and where the respective communications features of the audio only communication may include at least two of: a number of users in the audio only communication; whether the first user enabled a microphone associated with the first user; whether the second user enabled a microphone associated with the second user; a total amount of time that the user spoke in the audio only communication; or a total amount of time that the second user spoke in the audio only communication.

The method can include identifying a preferred communication modality of a second user of the other users. Presenting, in the user interface, the subset of the second communications may include: presenting the preferred communication modality of the second user in association with a communication of the subset of the second communications.

The method where a preferred communication modality is presented in the user interface in association with one of the subset of the second communications.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    identifying, by a communications monitoring software, first communications between a user and other users;
    associating, by the communications monitoring software, respective communication scores with the first communications based on respective communication feature scores of identified communications features of the first communications,
        wherein a first communication of the first communications is a video-based communication that includes another user, and the identified communication features of the first communication used to associate a communication score with the first communication comprise:
            whether the user enabled a first video camera associated with the user during the first communication;
            whether the another user enabled a second video camera associated with the another user during the first communication; and
    at least two of:
    a number of users in the first communication,
        a total amount of time that the user spoke in the first communication,
        a total amount of time that the another user spoke in the first communication,
        a total focus time of the user in the first communication, or
        a total focus time of the another user in the first communication;
    and
    wherein a second communication of the first communications is an audio only communication that includes a second user, and the identified communication features of the second communication comprise at least two of:
        a number of users in the audio only communication;
        whether the user enabled a microphone associated with the user;
        whether the second user enabled a microphone associated with the second user;
        a total amount of time that the user spoke in the audio only communication; or
        a total amount of time that the second user spoke in the audio only communication;
    identifying second communications associated with the user;
    identifying, by the communications monitoring software, a subset of the second communications based on the respective communication scores of the first communications; and presenting, in a user interface, the subset of the second communications to the user.

2. The method of claim 1, wherein the communications monitoring software is configured with permissions to access communications of at least some of the other users.

3. The method of claim 1, wherein the communications monitoring software is configured with permissions to access at least some communication types of at least some of the other users.

4. The method of claim 1, wherein a communication of the subset of the second communications is identified based on a sender of the communication.

5. The method of claim 1, wherein presenting, in the user interface, the subset of the second communications comprises:
including, in the user interface and in association with a communication of the subset of the second communications, an action associated with a communication modality for responding to the communication, wherein the communicating modality is different from a modality of the communication, and wherein the communication modality is based on a context of a sender of the communication.

6. The method of claim 1, wherein a communication of the subset of the second communications is identified responsive to determining that the communication relates to a role of the user.

7. The method of claim 1, wherein a third communication of the first communications is identified as an in-person communication between the user and the second user based on a proximity of a first device associated with the user and a second device associated with the second user.

8. A device,
comprising: a memory; and
a processor, the processor configured to execute instructions of a communications monitoring software stored in the memory to:
identify first communications between a user and other users;
associate respective communication scores with the first communications based on respective communication feature scores of identified communications features of the first communications,
wherein a first communication of the first communications is a video-based communication that includes another user, and the identified communication features of the first communication used to associate a communication score with the first communication comprise:
whether the user enabled a first video camera associated with the user during the first communication;
whether the another user enabled a second video camera associated with the another user during the first communication; and
at least two of:
a number of users in the first communication,
a total amount of time that the user spoke in the first communication,
a total amount of time that the another user spoke in the first communication,
a total focus time of the user in the first communication, or
a total focus time of the another user in the first communication;
and
wherein a second communication of the first communications is an audio only communication that includes a second user, and the identified communication features of the second communication comprise at least two of: a number of users in the audio only communication;
whether the user enabled a microphone associated with the user; whether the second user enabled a microphone associated with the second user;
a total amount of time that the user spoke in the audio only communication; or
a total amount of time that the second user spoke in the audio only communication;
identify second communications associated with the user;
identify, by the communications monitoring software, a subset of the second communications based on respective communication scores of the first communications; and
present, in a user interface, the subset of the second communications.

9. The device of claim 8, wherein the processor is configured with permissions to access communications of at least some of the other users.

10. The device of claim 8, wherein the processor is configured with permissions to access at least some respective communication types of at least some of the other users.

11. The device of claim 8, wherein a third communication of the first communications is a chat-based communication between the user and the second user, and
wherein the identified communication features of the third communication comprise at least two of:
a number of users in the chat-based communication;
a response delay time by the second user to a message transmitted from the user in the chat-based communication; or
a respective number of words in messages received from the second user.

12. The device of claim 8, wherein the processor is further configured to execute the instructions to:
identify a preferred communication modality of the second user of the other users; and wherein the instructions to present, in the user interface, the subset of the second communications comprise instructions to:
present the preferred communication modality of the second user in association with a communication of the subset of the second communications.

13. A non-transitory computer readable medium storing instructions operable to cause one or more processors to perform operations comprising:
identifying, by a communications monitoring software, first communications between a user and other users;
associating, by the communications monitoring software, respective communication scores with the first communications based on respective communication feature scores of identified communications features of the first communications,
wherein a first communication of the first communications is a video-based communication that includes another user, and the identified communication features of the first communication used to associate a communication score with the first communication comprise:
whether the user enabled a first video camera associated with the user during the first communication;
whether the another user enabled a second video camera associated with the another user during the first communication; and
at least two of:
a number of users in the first communication,
a total amount of time that the user spoke in the first communication,
a total amount of time that the another user spoke in the first communication,
a total focus time of the user in the first communication, or
a total focus time of the another user in the first communication;
and wherein a second communication of the first communications is an audio only communication that includes a second user, and the identified communication features of the second communication comprise at least two of:
a number of users in the audio only communication;
whether the user enabled a microphone associated with the user;
whether the second user enabled a microphone associated with the second user;
a total amount of time that the user spoke in the audio only communication; or
a total amount of time that the second user spoke in the audio only communication;
identifying second communications associated with the user;
identifying, by the communications monitoring software, a subset of the second communications based on respective communication scores of the first communications; and presenting, in a user interface, the subset of the second communications.

14. The non-transitory computer readable medium of claim 13, wherein the communications monitoring software is configured with permissions to access communications of at least some of the other users.

15. The non-transitory computer readable medium of claim 13, wherein the communications monitoring software is configured with permissions to access at least some respective communication types of at least some of the other users.

16. The non-transitory computer readable medium of claim 13, wherein a communication of the subset of the second communications is identified based on a sender of the communication.

17. The non-transitory computer readable medium of claim 13, wherein presenting, in the user interface, the subset of the second communications comprises:
including, in the user interface and in association with a communication of the subset of the second communications, a communication modality for responding to the communication, wherein the communicating modality is different from a modality of the communication, and wherein the communication modality is based on a context of a sender of the communication.

18. The non-transitory computer readable medium of claim 13, wherein a preferred communication modality is presented in the user interface in association with one of the subset of the second communications.

* * * * *